United States Patent [19]

Faccia

[11] Patent Number: 5,553,938
[45] Date of Patent: Sep. 10, 1996

[54] IMPROVED TRUCK FOR SHREDDING AND MIXING PRODUCTS FOR ZOOTECHNICAL USE INCLUDING AUTOMATICALLY ACTUATED COUNTERCUTTERS

[76] Inventor: Tiziano Faccia, Viale dell'Industria 3, 35023 Bagnoli di Sopra (Prov. of Padova), Italy

[21] Appl. No.: 530,852

[22] Filed: Sep. 20, 1995

[30] Foreign Application Priority Data

Sep. 28, 1994 [IT] Italy ................... PD94A0164

[51] Int. Cl.⁶ ................... B01F 7/4; B01F 15/00
[52] U.S. Cl. ................... 366/302; 366/314; 366/603; 241/101.76; 241/101.761
[58] Field of Search ................... 366/302, 307, 366/314, 318, 319, 323, 603; 241/33, 37, 101.76, 101.761, 101.8, 186.4

[56] References Cited

U.S. PATENT DOCUMENTS

| | | | |
|---|---|---|---|
| 4,003,502 | 1/1977 | Barcell | 241/101.761 X |
| 5,020,918 | 6/1991 | Faccia | 366/603 X |
| 5,082,188 | 1/1992 | Urich | 241/101.761 X |
| 5,175,917 | 1/1993 | Faccia | 29/267 |
| 5,429,436 | 7/1995 | Stone | 366/314 X |
| 5,462,354 | 10/1995 | Neier | 366/314 |

FOREIGN PATENT DOCUMENTS 0492395  7/1992  European Pat. Off.

*Primary Examiner*—Charles E. Cooley
*Attorney, Agent, or Firm*—Guido Modiano; Albert Josif

[57] ABSTRACT

A truck for shredding and mixing products for zootechnical use, comprising, on a self-propelled or towed wheeled chassis, a frustum-shaped container that tapers downwardly, is open at the top, and contains a scroll that rotates with a vertical axis and has an external profile that lies on a substantially conical ideal surface, shredding cutters being fitted at the profile. Countercutters, shaped substantially like a circular sector, are pivoted in a vertical arrangement, by means of their respective vertices, to the wall of the container in substantially radial positions and can be inserted and extracted through specifically provided slots. The truck furthermore comprises an automatic actuation and control device for the positioning of the countercutters according to work variables. The actuation and control device is constituted by an electronic control unit that controls a hydraulic section for the movement of the countercutters.

12 Claims, 2 Drawing Sheets

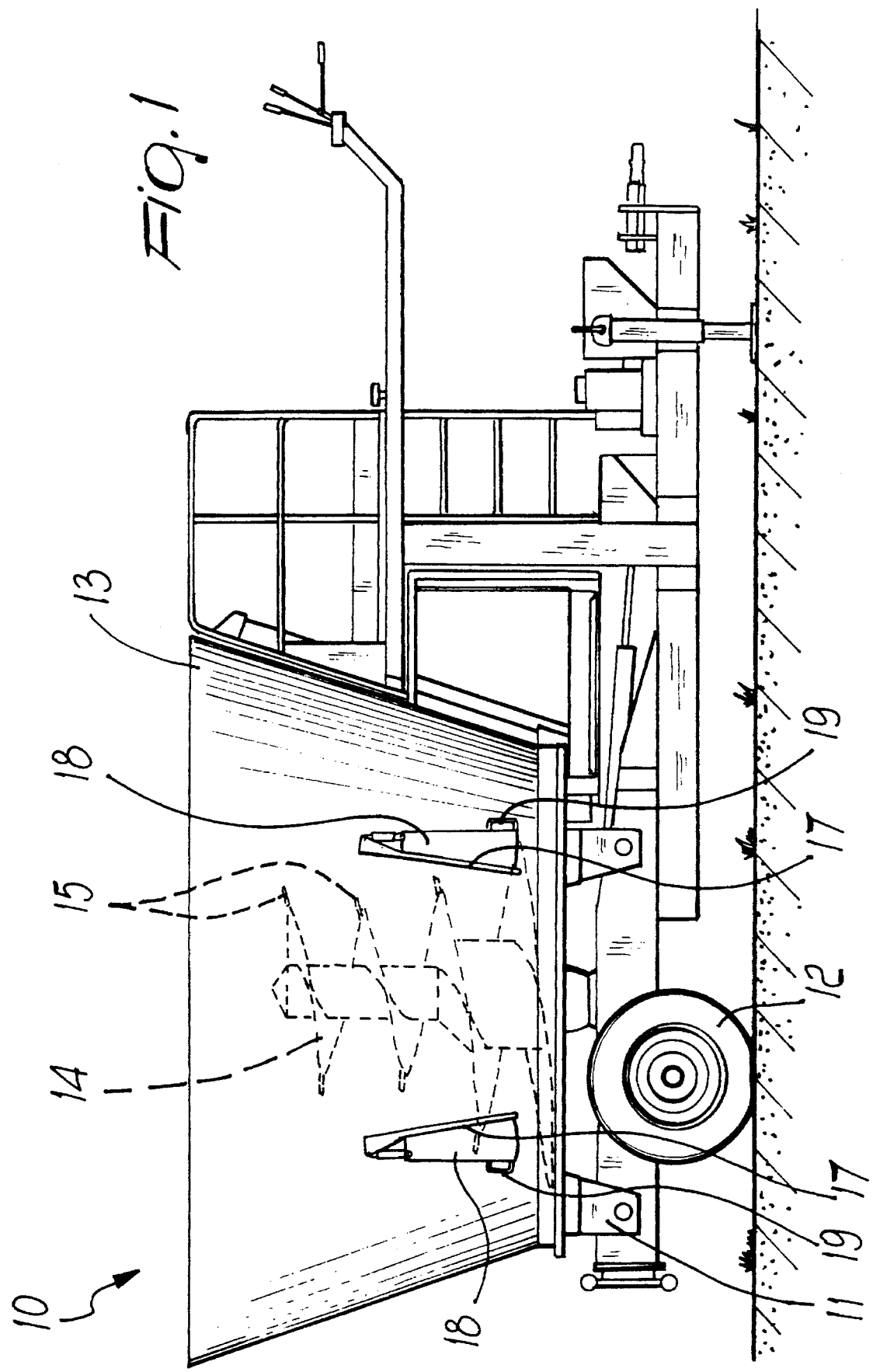

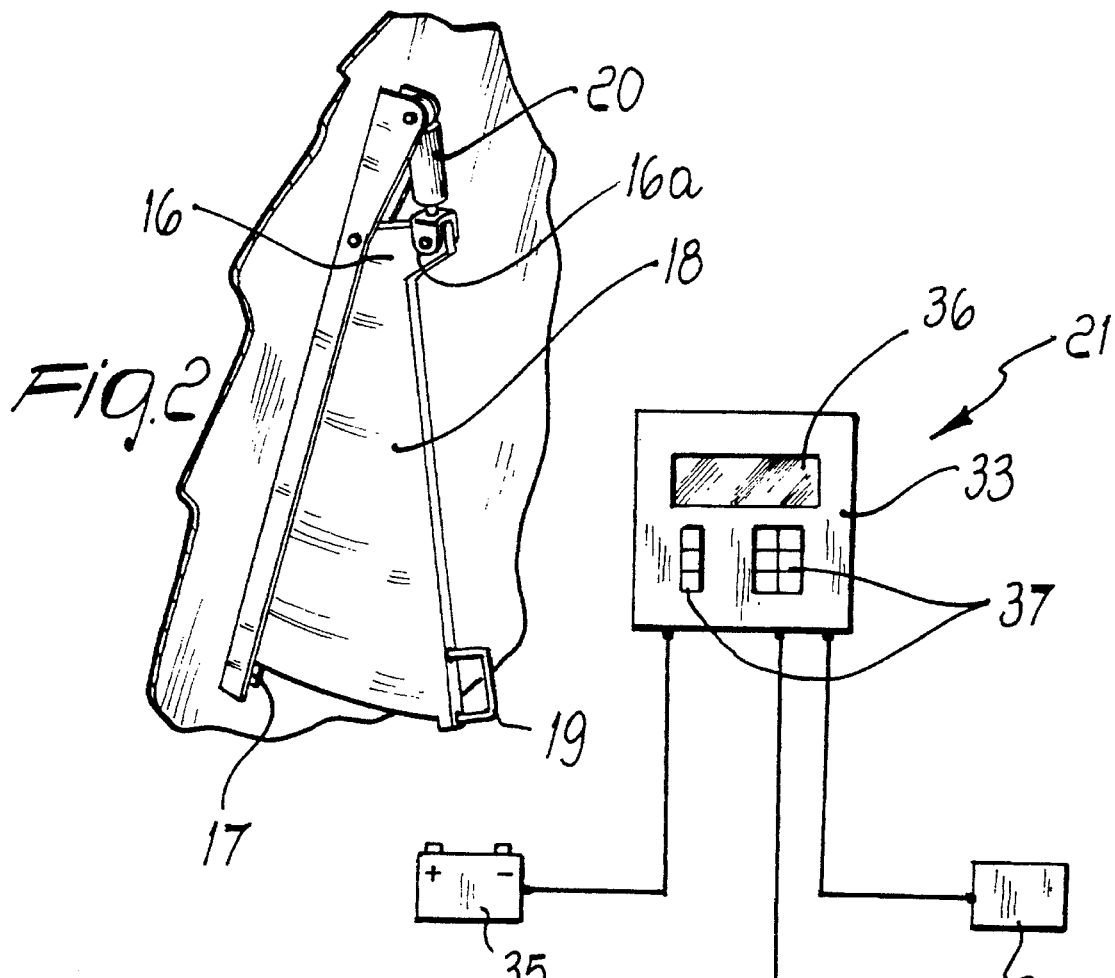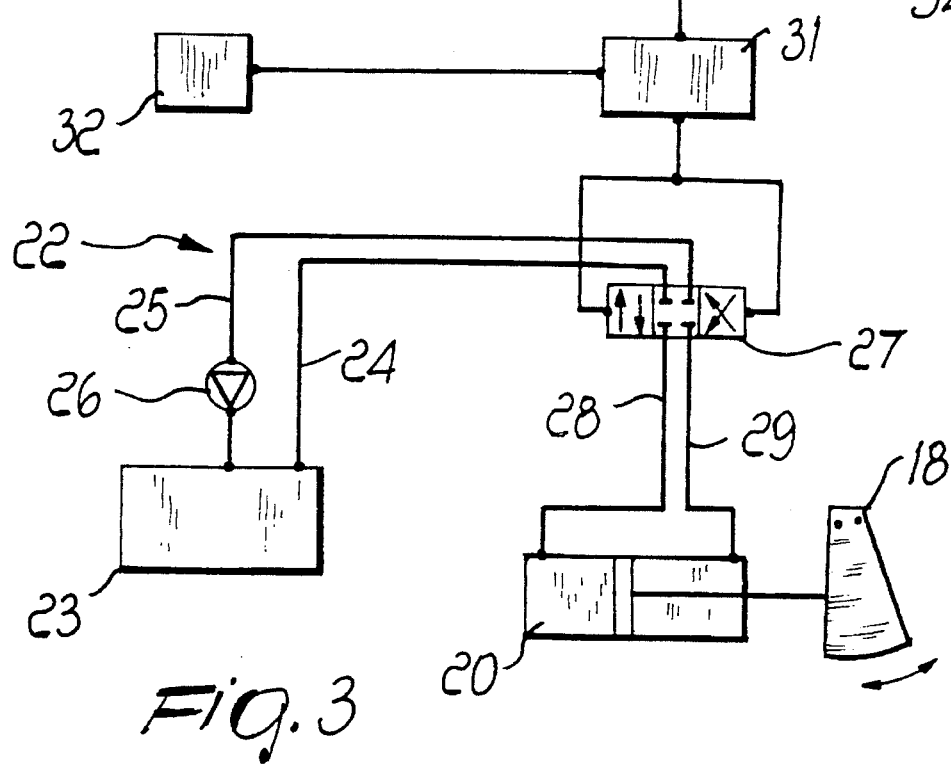

5,553,938

IMPROVED TRUCK FOR SHREDDING AND MIXING PRODUCTS FOR ZOOTECHNICAL USE INCLUDING AUTOMATICALLY ACTUATED COUNTERCUTTERS

BACKGROUND OF THE INVENTION

The present invention relates to an improved truck for shredding and mixing products for zootechnical use including automatically actuated countercutters.

Combined mixing and shredding trucks with a vertical scroll, substantially constituted by a frustum-shaped container that tapers downwardly and is arranged on a wheeled chassis, are currently widespread in the zootechnical field to prepare fodder for animals, particularly cattle.

A rotating scroll is arranged vertically inside said container, and the profile of its helix lies on a substantially conical ideal surface.

Cutters adapted to shred the product being mixed are fixed to the scroll in positions that are peripheral thereto; the product is loaded from the top and a large amount thereof is normally constituted by fibrous material such as hay and straw, with the addition of protein integrators, silage, floury products, etcetera.

Practical experience has shown that full exploitation of the potential of the above described truck requires, among other things, an adequate use of the countercutters, which indeed are essential components in the processing of the various elements introduced.

In fact, an inappropriate insertion of the countercutters sometimes causes the material not to be mixed and produces, at the discharge, a product that is not uniform and the nutritional characteristics whereof are therefore not optimum for the cattle.

In practice, a sort of doughnut forms around the walls of the container, having a central hole being formed by the scroll, and said doughnut does not mix with the other components.

The insertion and extraction of the cutters, as well as the operating times of these actuations, are therefore closely linked to the materials or to the mixtures thereof that are present inside the container at a given time.

From the foregoing it is evident that optimum use of said truck is rather sophisticated and therefore requires a skilled operator.

Experience has in fact pointed out that the average agricultural worker does not become acquainted with the correct use and operation of the countercutters, or in any case does not dedicate particular attention to them, and it often happens that he forgets the cutters in inserted position when they must not be inserted or vice versa, thus unavoidably causing the mentioned drawbacks.

SUMMARY OF THE INVENTION

A principal aim of the present invention is to provide a truck for shredding and mixing products for zootechnical use in which the movement of the countercutters is fully automated and thus independent of the operator.

With reference to the above aim, an object of the present invention is to provide an automation of the countercutters that is highly flexible and meets the most disparate requirements of the user.

Another object of the present invention is to provide a truck in which automation of the countercutters does not reduce overall operating reliability in any way.

Another object of the present invention is to provide a truck in which automation of the countercutters entails an additional cost that does not substantially affect the overall purchase cost.

This aim, these objects, and others which will become apparent hereinafter are achieved by an improved truck for shredding and mixing products for zootechnical use, which comprises, on a self-propelled or towed wheeled chassis, a frustum-shaped container that tapers downwardly, is open at the top, and contains a scroll that rotates about a vertical axis and has an external profile that lies on a substantially conical ideal surface. Shredding cutters are fitted at said profile, and countercutters, shaped substantially as a disk sector, are pivoted in substantially radial positions to the wall of said container with the vertices thereof in a vertical arrangement, such that said countercutters are insertable and extractable through specifically provided slots in the wall. The truck is characterized in that it comprises an automatic actuation and control device for the positioning of said countercutters according to work variables, in which said actuation and control device is constituted by an electronic control unit that controls means for moving said countercutters in response to the work variables.

BRIEF DESCRIPTION OF THE DRAWINGS

Further characteristics and advantages of the invention will become apparent from the description of an embodiment thereof, illustrated only by way of non-limitative example in the accompanying drawings, wherein:

FIG. 1 is a side view of a truck according to the invention;

FIG. 2 is an axonometric view of a detail of the truck according to the invention; and FIG. 3 is a schematic view of an embodiment of an automatic countercutter movement device, related to the truck of FIG. 1.

DESCRIPTION OF THE PREFERRED EMBODIMENTS

With reference to FIGS. 1 to 3, an improved truck for shredding and mixing products for zootechnical use, according to the invention, is generally designated by the reference numeral 10.

The truck 10 comprises, on a self-propelled or towed chassis 11 with wheels 12, a container 13 that is substantially frustum-shaped and tapers downwardly, and is open at the top.

A scroll 14 is located inside the container 13 and rotates about its own vertical axis; its external profile lies on a substantially conical ideal surface.

Shredding cutters 15 are fitted at said external profile.

Countercutters 18, substantially shaped like a disk sector, are instead pivoted to the wall of the container 13 by means of their respective vertices 16 in a vertical arrangement in substantially radial positions and can be inserted and extracted through appropriate slots 17 provided in the container 13.

The countercutters 18 have handles 19 for their optional manual movement.

Furthermore, in this case, the countercutters 18 are of the type in which the vertices 16 are pivoted in an upward region with respect to their corresponding sides that are curved so as to form circular arcs; in other cases, however, they may be of the type with vertices that are pivoted in a downward region, again relative to their corresponding sides that are curved so as to form circular arcs.

In addition to the handles 19, the countercutters 18 can be moved by means of actuators 20.

In particular, each actuator 20 has one end that is pivoted to the container 13 and an opposite end that is pivoted at a tab 16a that forms a lever and is related to the vertex 16 of a corresponding countercutter 18.

The actuators 20 are components of an automatic actuation and control device generally designated by the reference numeral 21.

The automatic device 21 comprises, in addition to the actuators 20 (which in practice are hydraulic cylinders), a hydraulic section 22 constituted by a tank 23 to which a discharge duct 24 and an inlet duct 25 are connected.

In particular, the flow of the duct 25 is produced by a pump 26.

The ducts 24 and 25 are connected to two other ducts 28 and 29 with the interposition of a slide-valve distributor 27 provided with electric valves for flow reversal.

The ducts 28 and 29 are connected to an actuator 20 that is actuated by the flow generated in said ducts.

The slide-valve distributor 27 is connected to a switching box 31.

Instead of the slide-valve distributor 27, electric valves can be provided, affecting respective branching ducts connected to corresponding countercutters 18.

A control device 33 of a per se known electromechanical type is also connected to the switching box 31 and can be actuated manually.

The switching box 31 is furthermore connected to an electronic control unit 33 provided with a microprocessor and with magnetic memories and/or with timers of a per se known type that are not shown in the figures, for programming movement sequences and positions of the countercutters 18 and for storing the data related to the work variables of the truck 19.

The electronic control unit 33 is furthermore connected to the load cells 34 for weighing the product, on which the container 13 is mounted, and to a power source 35.

Furthermore, the electronic control unit 33 is provided with a digital display 36 and with buttons 37 so that it can be programmed by the operator.

In practice, operation is as follows: the operator can have the dealer directly program a series of sequences for moving the countercutters 18 or can program them himself on the basis of cards or tables provided by the manufacturer regarding the optimum values of the operating parameters of the truck in relation to the mix to be produced.

Therefore, when he must for example process a given product, it is sufficient for him to set the desired program on the electronic control unit 33, so that said control unit moves the countercutters 18 according to the program and on the basis of the load detected by the load cells 34.

The control unit 33 moves the countercutters 18, as can be deduced from the foregoing, by actuating the slide-valve distributor 27, which reverses the flow in the ducts 28 and 29.

If, due to particular requirements, the operator must move the countercutters 18 in a different manner with respect to a given program, he substantially has the following possibilities: either to modify a previous program or even to produce a new one that includes the variation that has become necessary; or, if the variation is of the once-only type, disengage the automatic control of the slide-valve distributor 27 on the part of the electronic control unit 33, actuating by direct action by means of the control 32.

In practice it has been observed that the intended aim and objects have been achieved; in particular, it should be noted that the automation included in the movement of the countercutters almost completely frees the operator from the burden of keeping under constant watch their position, which as mentioned is fundamental for good utilization of the truck.

Furthermore, if the operator wishes to do so, he can rely directly upon the manufacturer or upon the dealer for optimum programming of the movement according to the specific products.

The automatic device thus conceived is widely flexible, since it can also be actuated directly by manual actuation, and in appropriate configurations it can produce a selective actuation of the countercutters 18.

It should also be noted that the extreme constructive simplicity of the automatic device makes it a reliable component of the truck that requires little maintenance.

The present invention is susceptible of numerous modifications and variations, all of which are within the scope of the inventive concept.

All the details may furthermore be replaced with other technically equivalent elements.

In practice, the materials employed, as well as the dimensions, may be any according to the requirements.

What is claimed is:

1. A truck for shredding and mixing products for zootechnical use, comprising:

a self-propelled or towed wheeled chassis;

a frustum-shaped container that tapers downwardly, said container being open at the top and being supported on said chassis;

a scroll rotatable about a vertical axis and housed in said container, said scroll having an external profile lying on a substantially conical ideal surface;

shredding cutters fitted at said profile;

countercutters, shaped substantially as a disk sector, pivoted in substantially radial positions to the wall of said container with vertices thereof in a vertical arrangement, said countercutters being insertable and extractable through specifically provided slots in the wall of said container; and an automatic actuation and control device for positioning said countercutters according to work variables;

said automatic actuation and control device comprising:

movement means for moving said countercutters; and an electronic control unit that controls said movement means in response to said work variables.

2. Truck according to claim 1, wherein said electronic control unit comprises a microprocessor and one or more elements selected from magnetic memories and timers for programming movement sequences and positions of said countercutters, and for storing data related to said work variables.

3. Truck according to claim 1, wherein said movement means comprises a hydraulic circuit.

4. Truck according to claim 3, wherein said hydraulic circuit comprises at least one actuator for each one of said countercutters, flow inside said at least one actuator being controlled by at least one slide-valve distributor that is operated by said control unit.

5. Truck according to claim 4, further comprising actuation means for said at least one slide-valve distributor, said actuation means being actuatable manually.

6. Truck according to claim 5, wherein said manually-actuated actuation means are of an electromechanical type.

7. A truck for shredding and mixing products for zootechnical use, comprising:

a self-propelled or towed wheeled chassis;

a frustum-shaped container that tapers downwardly, said container being open at the top and being supported on said chassis;

a scroll rotatable about a vertical axis and housed in said container, said scroll having an external profile lying on a substantially conical ideal surface;

shredding cutters fitted at said profile;

countercutters, shaped substantially as a disk sector, pivoted in substantially radial positions to the wall of said container with vertices thereof in a vertical arrangement, said countercutters being insertable and extractable through specifically provided slots in the wall of said container; and an automatic actuation and control device for positioning said countercutters according to work variables;

said automatic actuation and control device comprising:

apparatus for pivotally moving said countercutters; and an electronic control unit that controls said apparatus for pivotally moving said countercutters in response to said work variables.

8. Truck according to claim 7, wherein said electronic control unit comprises a microprocessor and one or more elements selected from magnetic memories and timers for programming movement sequences and positions of said countercutters, and for storing data related to said work variables.

9. Truck according to claim 7, wherein said apparatus for pivotally moving said countercutters comprises a hydraulic circuit.

10. Truck according to claim 9, wherein said hydraulic circuit comprises at least one actuator for each one of said countercutters, flow inside said at least one actuator being controlled by at least one slide-valve distributor that is operated by said control unit.

11. Truck according to claim 10, further comprising an actuation device for actuating said at least one slide-valve distributor, said actuation device being actuatable manually.

12. Truck according to claim 11, wherein said actuation device is of an electromechanical type.

* * * * *